United States Patent [19]

Shido et al.

[11] Patent Number: 5,414,690
[45] Date of Patent: May 9, 1995

[54] MOVING APPARATUS, A MOVING METHOD AND AN INFORMATION DETECTION AND/OR INPUT APPARATUS USING THE SAME

[75] Inventors: Shun-Ichi Shido, Yokohama; Toshihiko Miyazaki, Hiratsuka; Kunihiro Sakai, Isehara; Takahiro Oguchi, Atsugi, all of Japan

[73] Assignee: Canon Kabushiki Kaisha, Tokyo, Japan

[21] Appl. No.: 328,391

[22] Filed: Oct. 24, 1994

Related U.S. Application Data

[63] Continuation of Ser. No. 826,411, Jan. 27, 1992, abandoned.

[30] Foreign Application Priority Data

Jan. 29, 1991 [JP] Japan ................... 3-029349
Jan. 29, 1991 [JP] Japan ................... 3-029350

[51] Int. Cl.⁶ .............................. H01J 37/26
[52] U.S. Cl. ..................... 369/126; 250/306
[58] Field of Search ........... 369/126; 250/306, 307, 250/310; 365/151; 73/105

[56] References Cited

U.S. PATENT DOCUMENTS 4,962,480 10/1990 Ooumi et al. ............... 369/126
5,162,653 11/1992 Hosaka et al. ............. 250/306
5,229,606 7/1993 Elings et al. .............. 250/306

FOREIGN PATENT DOCUMENTS 0272935 6/1988 European Pat. Off. .
0307211 3/1989 European Pat. Off. .
63-161552 7/1988 Japan .
63-161553 7/1988 Japan .

OTHER PUBLICATIONS

Stupian, et al., "A Scanning Tunneling Microscope Based on A Motorized Micrometer," Rev. Sci. Instrum., vol. 60, No. 2, Feb. 1989, pp. 181–185.
Stupian, et al., "The Use of a Linear Piezoelectric Actuator for Coarse Motion in a Vacuum Compatible Scanning Tunneling Microscope," J. Vac. Sci. Technol., vol. 7, No. 4, Jul.–Aug. 1989, pp. 2895 through 2987.
Hipps, et al., "A Scanning Tunneling Microscope with a Wide Sampling Range," Rev. Sci. Instrum., vol. 61, No. 7, Jul. 1990, pp. 1869–1873.
Patent Abstracts of Japan, Kokai No. 02-275302, vol. 15, No. 37, Jan. 1991.
Patent Abstracts of Japan, Kokai No. 04-155633, vol. 16, No. 445, May 1992.
Binnig, et al., "Scanning Tunneling Microscopy," Helvetica Physica Acta, vol. 55, 1982, pp. 726 through 735.
G. Binnig, et al., "Tunneling Through a Controllable Vacuum Gap," Appl. Phys. Lett. vol. 40, No. 2, Jan. 1982, pp. 178 through 180.

Primary Examiner—Paul M. Dzierzynski
Assistant Examiner—Don Wong
Attorney, Agent, or Firm—Fitzpatrick, Cella, Harper & Scinto

[57] ABSTRACT

An apparatus for and a method of moving a probe for causing a physical phenomenon to occur between it and a predetermined object and moving the probe and the object relative to each other to make the probe approach the object. At least one of the probe and the object is driven in a predetermined direction to displace one of the probe and the object in the predetermined direction relative to the other. A physical phenomenon occurring between the probe and the object is detected. At least one of the probe and the object is driven so as to bring the probe and the object close to each other. The driving for the approach of the probe to the object is controlled on the basis of the result of the detection of the physical phenomenon during the driving in the predetermined direction. The specification also discloses an information detection and/or input apparatus using such apparatus and method.

13 Claims, 5 Drawing Sheets

MOVING APPARATUS, A MOVING METHOD AND AN INFORMATION DETECTION AND/OR INPUT APPARATUS USING THE SAME

This application is a continuation of prior application, Ser. No. 07/826,411, filed Jan. 27, 1992, now abandoned.

BACKGROUND OF THE INVENTION

1. Field of the Invention

This invention relates to a moving apparatus, a moving method and an information detection and/or input apparatus using the same, which are suitably used to make a probe approach a sample, particularly in an apparatus utilizing a physical phenomenon observed when the probe is made to approach the sample.

2. Related Background Art

In recent years, there has been developed a scanning type tunnel microscope (hereinafter referred to as STM) in which a physical phenomenon such as a tunnel phenomenon observed when a probe is made to approach a sample is utilized to directly observe the surface of a substance and the electron structure near the surface [G. Binnig et al., Helvetica Physica Acta, 55,726 (1982)] and thus, it has become possible to measure a real spatial image at high resolving power irrespective of single crystal or amorphous materials. STM also has the advantage that it can accomplish observation with low electric power without imparting damage by an electric current to a medium, and further can operate not only in a super-high vacuum, but also in the atmosphere and solutions and can be used for various materials, and its wide applications in accordance therewith or in the research field are expected. Also, in the industrial field, as disclosed, for example, in Japanese Laid-Open Patent Applications No. 63-161552 and No. 63-161553, attention is paid to the principle that the sizes of atoms or molecules have spatial resolving power, and the application of STM to recording-reproducing apparatuses and putting STM into practical use have been energetically put forward.

Now, such STM or recording-reproducing apparatus is directed to measure a tunnel current or the like while the probe is scanned parallel to the surface of the sample, thereby knowing the physical amount distribution on the surface of the sample, and in order that such a purpose may be attained, it is necessary that the sample and the probe be sufficiently close to each other to such a degree that a tunnel current flows between the sample and the probe. However, when there is relatively great unevenness on the surface of the sample, for example, when the approach position of the probe is a concave portion of the sample, collision or contact may be caused between the probe and the sample by scanning being started if not during the approach of the probe to the sample. As a result, not only may the sample be damaged, but also the tip end of the probe may be crushed flat and the radius of curvature thereof may be increased, thus causing a reduction in spatial resolving power.

Also, in the case of an applied apparatus such as a recording-reproducing apparatus, it is necessary to make the probe approach the recording surface avoiding concave portions of the latter.

Also, for such STM or recording-reproducing apparatus to function properly, as described above, it is necessary that the sample and the probe be sufficiently close to each other to such a degree that a tunnel current flows between the sample and the probe. Therefore, an appropriate probe approach mechanism for approximating in advance the distance between the sample and the probe to a distance at which the tunnel phenomenon is observed is indispensable. Heretofore, a stepping motor, an inch worm or a laminated piezo-electric member has specifically been utilized as the approach mechanism (Applied Physics Letter, vol. 40 (1982), pp. 178–180), but by the conventional approach means, the positional accuracy of the probe cannot be obtained due to parasitic oscillation or creep phenomenon occurring during movement, and the possibility of the probe impacting the sample when the probe is made to approach the sample is high. This leads to the problem that not only is the sample damaged, but also the tip end of the probe is crushed flat and the radius of curvature thereof is increased, thus causing a reduction in spatial resolving power.

SUMMARY OF THE INVENTION

In view of the above-described example of the prior art, it is a primary object of the present invention to provide a moving apparatus and a moving method which enables such an approaching operation that a probe does not contact or collide with a sample or the like when the probe approaches the sample or when the probe starts to scan the sample, and to provide an information detection and/or input apparatus using the same.

Other objects of the present invention will become apparent from the following detailed description of some embodiments of the invention.

DETAILED DESCRIPTION OF THE PREFERRED EMBODIMENTS

In a first embodiment of the present invention which will hereinafter be described, a probe moving apparatus is confirmed at first on the highest convex portion of the surface of a sample in which the approach of a probe to the sample is within a sweep range.

Description will hereinafter be made in detail with reference to the drawings.

Figure 1:
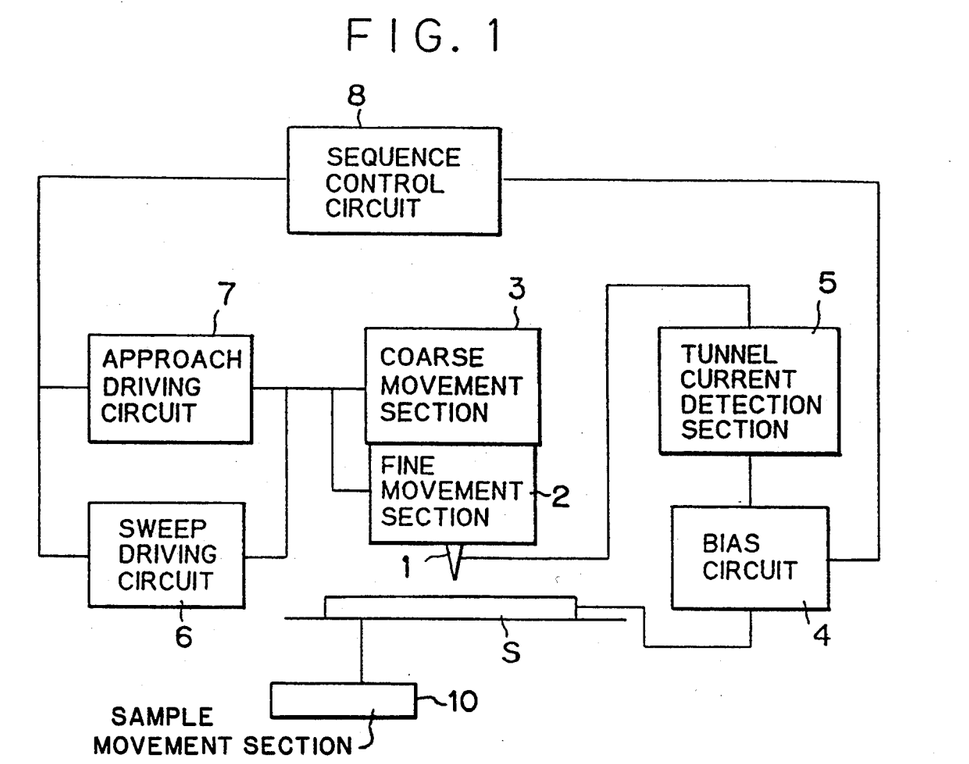
FIG. 1 is a block diagram showing the circuit construction of a first embodiment of the present invention.
Figure 2:
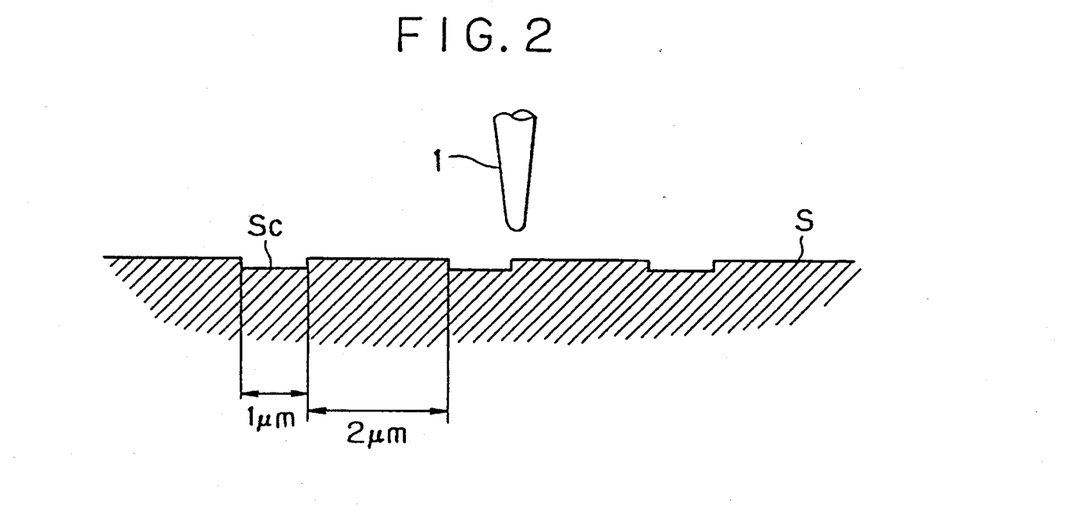
FIG. 2 is a cross-sectional view of the surface of a sample.

FIG. 1 is a block diagram showing the circuit construction of the first embodiment, and shows a case where the probe 1 is made to approach the sample S while a tunnel current is observed. Alternatively, the sample S is made to approach, by drive mechanism 10 (which can include first and second actuators), the probe 1 while a tunnel current is observed. It is to be understood that the sample S, as shown, for example, in FIG. 2, is a silicon substrate on which straight grooves Sc each having a width of 1 $\mu$m and a depth of 0.1 $\mu$m are etched at intervals of 2 $\mu$m. The probe 1 is provided on a fine movement section 2 using, for example, a piezo-electric actuator, and the fine movement section 2 is mounted on a coarse movement section 3 movable over a wide range by the use, for example, of a stepping motor or the like. A weak bias voltage is applied between the sample S and the probe 1 by a bias circuit 4, and the tunnel current flowing between the two is measured by a tunnel current detection section 5. The fine movement section 2 is adapted to sweep (vibrate at a constant amplitude) within a range of a width of e.g. 2 $\mu$m along the sample S in a direction orthogonal to the straight grooves Sc by a sweep driving circuit 6. Further, the fine movement section 2 is designed to be finely movable toward the sample S within a range of e.g. a maximum of 0.2 $\mu$m or so by an approach driving circuit 7 with the aid of a laminated piezo-electric member or the like, and the coarse movement section 3 is designed to be coarsely moved toward the sample S at a step of 0.1 $\mu$m within a movement range of e.g. 10 $\mu$m or so, and the operations of the sweep driving circuit 6 and the approach driving circuit 7 are controlled by a sequence control circuit 8, and the probe 1 approaches the sample S by an operation as described below without colliding with the sample S until the tunnel current is observed by the tunnel current detection section 5.

Figure 3:
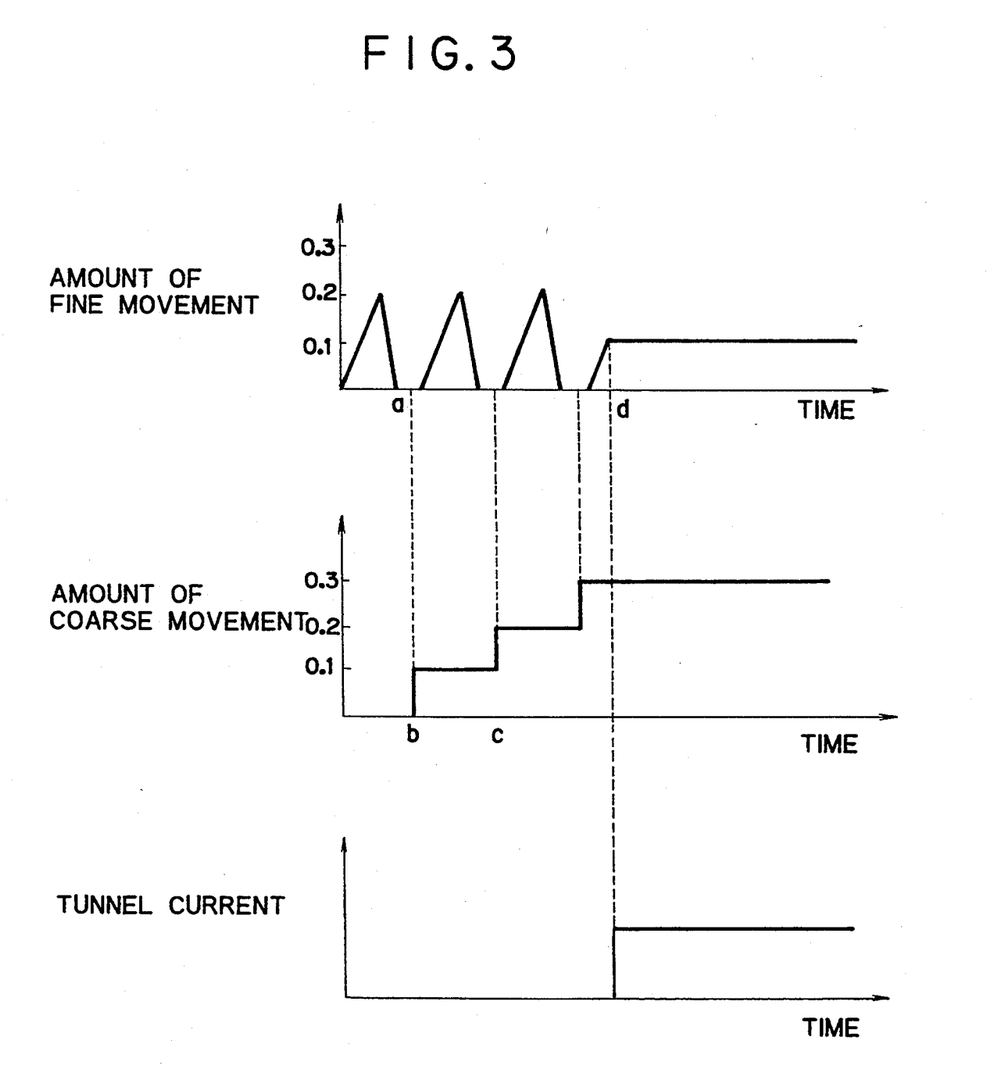
FIG. 3 is a time chart for illustrating the operation of the first embodiment.

That is, the probe 1 is first kept away from the sample S, and the sweep of the fine movement section 2 is started by the sweep driving circuit 6. Then, it is confirmed whether the tunnel current flows, while the fine movement section 2 is stretched to a maximum distance toward the sample S as the sweep is continued as shown in FIG. 3 (a). If the tunnel phenomenon does not appear and the tunnel current is not observed, the fine movement section 2 is immediately contracted and the coarse movement section 3 is advanced by one step (b). Since one step of the coarse movement section 3 is 0.1 $\mu$m, the probe 1 exists within a range examined from the stretch 0.2 $\mu$m of the fine movement section 2 at the last time. That is, the probe 1 is not brought closer to the sample S by coarse movement than during the last fine movement, and the tunnel current does not begin to flow during this coarse movement. Subsequently, whether the tunnel current flows in the process wherein the fine movement section 2 is again stretched to the maximum as the sweep is continued is examined. If the tunnel phenomenon does not appear and the tunnel current is not observed, the fine movement section is contracted and by coarse movement, the probe 1 is brought close to the sample S by a further step. Thereafter, the above-described operation is repeated, and at a point of time (d) whereat the tunnel current is observed, the approach step is completed, the sweep is stopped and thus, the sequence control is terminated. Of course, these steps also can be utilized to move the sample relative to the probe.

According to such a method, the tunnel current is observed at first on the convex portions of the sample S without fail, and it never happens that the probe 1 goes into the recesses such as the grooves Sc, and the collision of the probe 1 with the sample S can be avoided when scanning is started. Not only are the recesses avoided, but also any abnormal convex portion which may be present on the sample S can be detected when the probe 1 approaches the sample S and therefore, the probe 1 can be made to sweep the sample avoiding such portion, and approach only the normal portion of the sample.

Description will now be made of an embodiment we have actually used for STM. STM comprises a construction as shown in FIG. 1. The probe 1 is moved up and down in a direction perpendicular to the surface of the sample by feedback control so that the tunnel current flowing by a predetermined voltage applied between the sample S and the probe 1 by the bias circuit 4 may become constant. By the use of the sweep driving circuit 6, the probe 1 is swept parallel to the surface of the sample, and a system which reads out the then upward and downward movement of the probe 1 as a signal and outputs it as an image is STM. Again in that case, collision may often occur between the probe 1 and the sample S at the first stage of approach of the former to the latter, thus damaging the sample S or the probe 1. So, we have repeatedly carried out a series of experiments of spacing the probe 1 apart from the sample S, again making the probe 1 approach the sample S and observing the sample, by the use of the present invention. As a result, it has been confirmed that the disturbance or the like of the tunnel current caused by the damage of the sample S by the collision during sweep becomes null and an image of high spatial resolving power can be observed with good reproducibility and the probability of collision or contact has decreased.

Description will further be made of an embodiment in a case where we have used the present invention for an information processing apparatus. Describing first the basic operation of the information processing apparatus, the construction of FIG. 1 is used and a recording medium is used in lieu of the sample S, and in addition to the aforedescribed STM operation, a particular voltage signal based on recording information is superposed on a bias voltage by the bias circuit 4, whereby an electrical variation is caused on the surface of the recording medium corresponding to the then position of the probe 1 and information is written onto the recording medium. Also, reading-out is effected by an electric current signal obtained by the STM operation or a signal indicative of the upward and downward movement of the probe 1, and erasing is effected by applying a predetermined voltage signal to that same position to thereby restore the electrical state change on the surface of the recording medium to the original state.

As regards a specific embodiment, as disclosed in Japanese Laid-Open Patent Applications No. 63-161552 and No. 63-161553, a recording medium comprising an LB film (two-layer film) of a polymer (for example, polyimide) of heterocyclic compounds laminated on a gold (Au) electrode was disposed in lieu of the sample S of FIG. 1, and recording, reproduction and erasing were effected. In such an apparatus, a voltage obtained by superposing continuous pulse waves of crest values $-6$ V and $+1.5$ V on a bias voltage by the bias circuit 4 was applied between the recording medium and the probe 1 while the probe 1 was scanned in the XY direction so that the tunnel current might be constant, whereby the electrical writing of information was effected and further, the recorded surface was again scanned by the probe 1 and the reading-out of recording information was effected from an STM image using a variation in the tunnel current obtained by the tunnel current detection circuit 5. As a result, it could be confirmed that the recording information and reproduced information coincided with each other with good reproducibility even if the above-described operation was repetitively performed. From this, it can be seen that the probe 1 can be made to approach the recording surface without destroying the recording medium even when the above-described operation is repetitively performed. Also, it was confirmed that when the operation of superposing a pulse voltage of having a crest value 3 V on a bias voltage between the recording medium and the probe 1 by the bias circuit 4 at a point of time whereat the probe 1 approached an area on the recording medium on which recording was effected in the course of scanning, the recorded information was erased from the STM image reproduced. Again in this case, of course, the collision of the probe 1 with the recording medium could be effectively prevented by the approach mechanism of the present invention.

The method according to the present embodiment can be applied to any apparatus in which an approach mechanism can be operated while a probe is scanned parallel to the surface of a sample, and is not restricted in the shape of the sample and the mechanism and structure of sweep and approach.

Also, in the present embodiment, a description has been made of an STM and an information processing apparatus for measuring tunnel current as physical information, whereas the present invention is equally applicable to measuring apparatuses for observing the force between atoms, capacity, magnetic flux, magnetic force, etc.

As described above, the probe moving apparatus according to the above-described embodiment can accomplish measurement while keeping the shape of the top end of the probe sharp without causing the probe to collide with the sample because the probe does not go into the recess of the sample, and observation higher in spatial resolving power becomes possible. Also, the probe is not damaged and therefore, the interchange of the probe is not required, and this leads to the advantage that the simplification and compactness of the system can be achieved in STM and information recording apparatuses. Further, it is also possible to avoid uneven portions of the sample and make the probe selectively approach a flat portion of the sample, and this is useful in information recording and reproduction.

A second embodiment of the present invention will be explained below in detail according to FIGS. 4 and 5.

Figure 4:
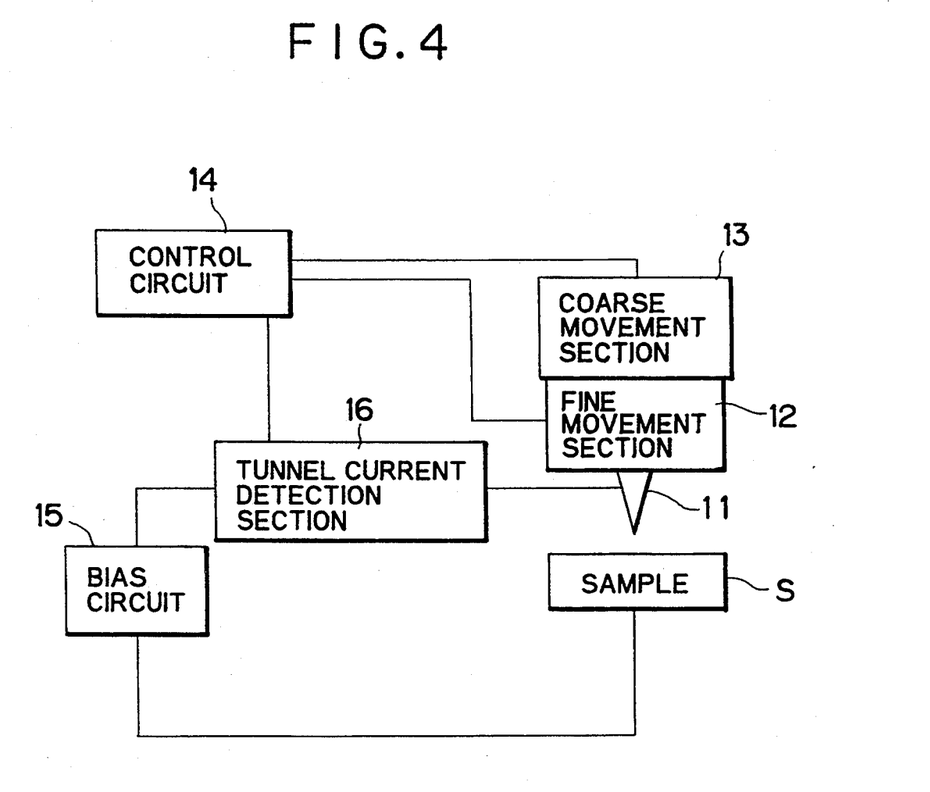
FIG. 4 is a block diagram showing the circuit construction of a second embodiment of the present invention.
Figure 5:
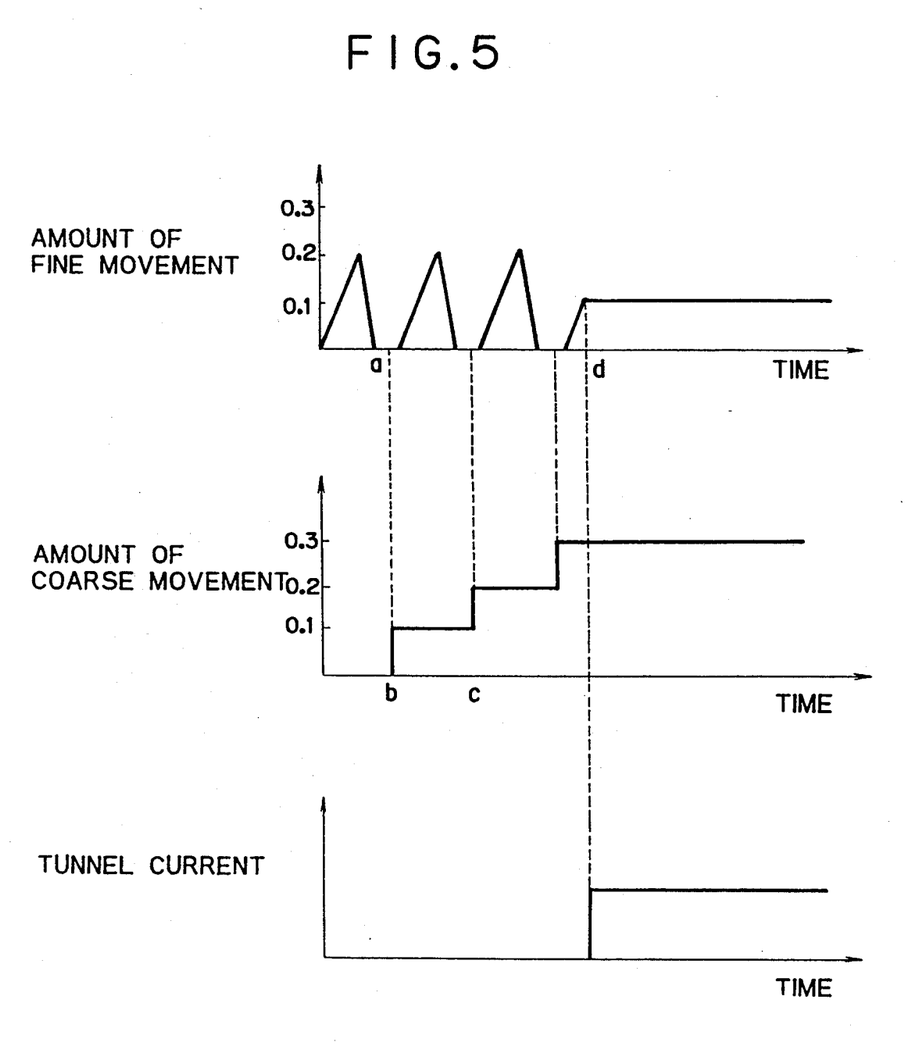
FIG. 5 is a time chart for illustrating the operation of the second embodiment.

FIG. 4 is a block diagram showing the circuit construction of STM, and shows a case where a probe 11 is made to approach a sample S while a tunnel current is observed. In FIG. 4, the probe 11 is provided on a fine movement section 12 using, for example, a piezo-electric actuator, and the fine movement portion 12 in turn is mounted on a coarse movement section 13 movable over a wide range, for example, by the use of a stepping motor or the like. The operations of the fine movement section 12 and the coarse movement section 13 are controlled by a sequence control circuit 14. Also, a weak bias voltage is applied between the sample S and the probe 11 by a bias circuit 15, and a tunnel current flowing between the two is measured by a tunnel current detection section 16.

The fine movement section 12 is designed to be finely movable within a range of e.g. a maximum of 0.2 $\mu$m or so by a laminated piezo-electric member or the like, and the coarse movement section 13 is designed to be coarsely movable within a movement range of e.g. 10 mm or so at a step of 1.0 $\mu$m, and the fine movement section 12 and the coarse movement section 13 are both controlled by the control circuit 14, and the probe 11 approaches the sample S by the operation as will be described below without colliding with the latter until the tunnel current is observed by the tunnel current detection section 16. FIG. 5 is a time chart showing the amounts of movements of the fine movement section 12 and coarse movement section 13 at this time and the tunnel current detected.

That is, the probe 11 is first kept spaced apart from the sample S, and it is confirmed whether the tunnel current flows, while the fine movement section 12 is stretched to a maximum distance of 0.2 $\mu$m (a). If the tunnel phenomenon does not appear and the tunnel current is not observed, the fine movement section 12 is immediately contracted. Subsequently, the coarse movement section 13 is moved by one step (b). Since one step of the coarse movement section 13 is 1.0 $\mu$m, the probe 11 exists within a range examined by the stretch of 0.2 $\mu$m of the fine movement section 12 at the last time. That is, the probe 11 does not become closer to the sample S by the coarse movement than during the last fine movement, and the tunnel current does not begin to flow during this coarse movement. Subsequently, it is examined whether the tunnel current flows in the process of moving the fine movement section 12 again to a maximum distance. If the tunnel phenomenon does not occur and the tunnel current is not observed, the fine movement section 12 is contracted and again by coarse movement, the probe 11 is brought close to the sample by a further step (c). Thereafter, the above-described procedure is repeated, and at a point of time (d) whereat the tunnel current is observed, the approach process is completed and thus, sequence control is terminated.

Figure 6:
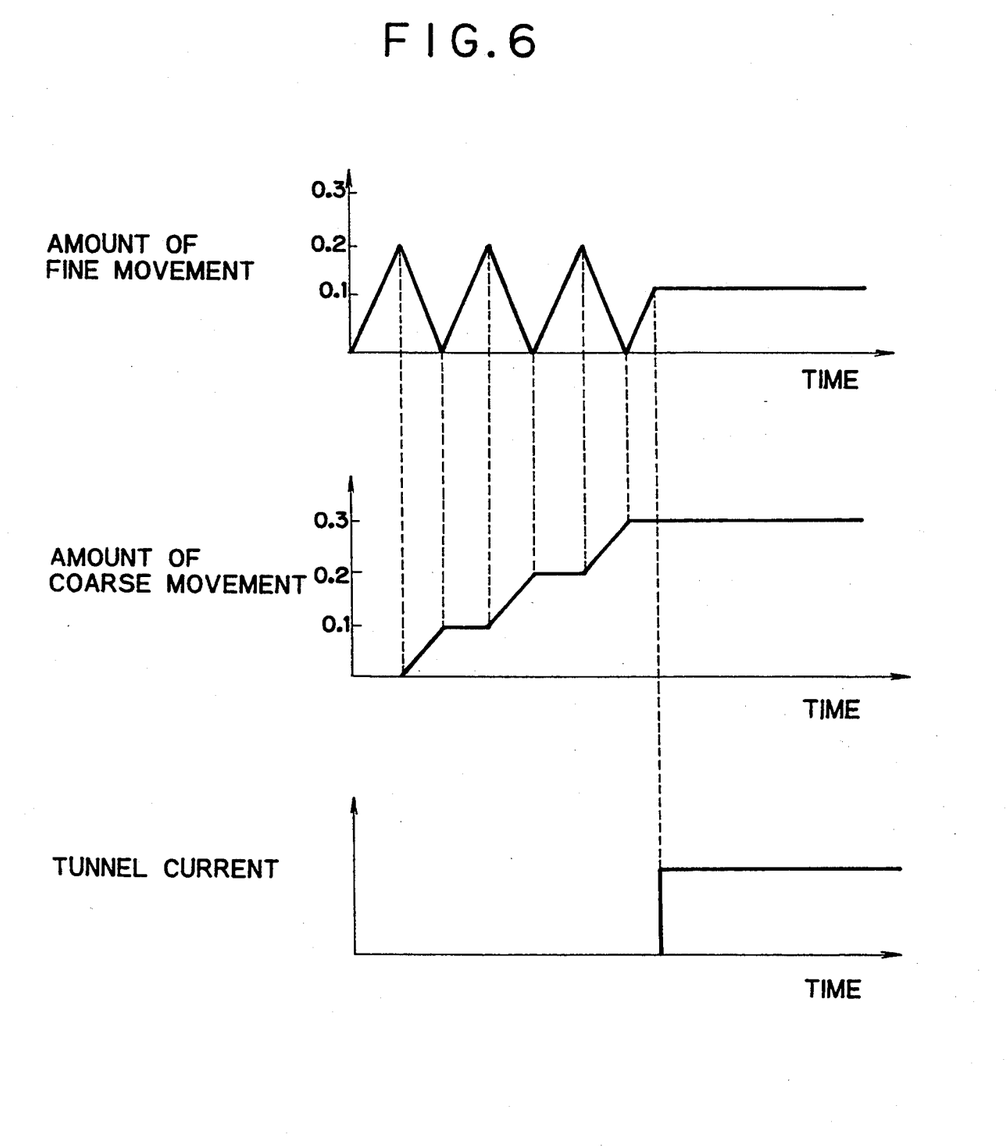
FIG. 6 is a time chart for illustrating the operation of a third embodiment of the present invention.

FIG. 6 is a time chart during approach control in a third embodiment, and the apparatus construction of this embodiment is similar to that of FIG. 4 and need not be shown and described. The present embodiment is applicable to a case where the driving of the coarse movement section 13 is not of the step type as in the case of a laminated piezo-electric member. That is, during the forward movement of the fine movement section 12, the coarse movement section 13 is stopped, and in accordance with the backward movement of the fine movement section 12, the coarse movement section 13 is moved forward at a speed at greatest below the speed of the backward movement of the fine movement section 12. Again in this case, by coarse movement, the probe 11 does not become closer to the sample S than the range of the last fine movement, and the tunnel current does not begin to flow during coarse movement.

In any of the above-described systems, the tunnel current begins to flow without fail during fine movement and is not at all affected by parasitic oscillation which is a problem arising when the coarse movement section 13 is driven. Therefore, an abnormal increase in a spike-like tunnel current produced upon completion of approach when the probe is made to approach the sample in the prior art approach mechanism can be prevented, and the probability with which damage is caused by the collision of the tip end of the probe 11 with the sample S can be greatly decreased.

Description will now be made of an embodiment we have actually used for STM. STM is of a construction as shown in FIG. 4. The probe 11 is moved up and down in a direction perpendicular to the surface of the sample by feedback control so that the tunnel current flowing by a predetermined voltage applied between the sample S and the probe 11 by the bias circuit 15 may become constant. At the same time, the probe 11 is moved parallel to the surface of the sample, and a system which reads out the then upward and downward movement of the probe 11 as a signal and outputs it as an image is STM. Again in that case, collision may often occur between the sample S and the probe 11 at the first stage of approach of the probe to the sample, thus damaging the sample S or the probe 11. So, we carried out a series of experiments of spacing the probe 11 apart from the sample S, again making the probe approach the sample and observing the sample, by the use of the present invention. As a result, it was confirmed that the disturbance or the like of the tunnel current caused by the damage of the sample S by the collision during approach became null and an image high in spatial resolving power could be observed with good reproducibility and the probability of collision or contact decreased.

Description will further be made of an embodiment in a case where we have used the present invention for an information processing apparatus. Describing first the basic operation of the information processing apparatus, the construction of FIG. 4 is used and a recording medium is used in lieu of the sample S, and in addition to the aforedescribed STM operation, a particular voltage signal is superposed on a bias voltage by the bias circuit 15, whereby an electrical variation is caused on the surface of the recording medium corresponding to the then position of the probe 11 and information is written onto the recording medium. Reading-out is effected by an electric current signal obtained by the STM operation or a signal indicative of the upward and downward movement of the probe 11, and erasing is effected by applying a predetermined voltage signal to that same position to thereby restore the electrical state change on the surface of the recording medium to the original state.

As regards a specific embodiment, as disclosed in Japanese Laid-Open Patent Applications No. 63-161552 and No. 63-161553, a recording medium comprising an LB film (two layer film) of a polymer (for example, polyimide) of heterocyclic compounds laminated on a gold (Au) electrode was disposed in lieu of the sample S of FIG. 4, and recording, reproduction and erasing were effected. In such an apparatus, a voltage obtained by superposing continuous pulse waves of crest values $-6$ V and $+1.5$ V on a bias voltage by the bias circuit 15 was applied between the recording medium and the probe 11 while the probe 11 was scanned in the XY direction so that the tunnel current might be constant, whereby the electrical writing of information was effected and further, the recorded surface was again scanned by the probe 11 and the reading-out of recording information was effected from an STM image using a variation in the tunnel current obtained by the tunnel current detection circuit 16. As a result, it could be confirmed that the recording information and reproduced information coincided with each other with good reproducibility even if the above-described operation was repetitively performed. From this, it can be seen that the probe 11 can be made to approach the recording surface without destroying the recording medium even when the above-described operation is repetitively performed. Also, it was confirmed that when the operation of superposing a pulse voltage having a crest value 3 V on a bias voltage between the recording medium and the probe 11 by the bias circuit 15 at a point of time whereat the probe 11 approached an area on the record-ing medium on which recording was effected in the course of scanning, the recorded information was erased from the STM image reproduced. Again in this case, of course, the collision of the probe 11 with the recording medium could be effectively prevented by the approach mechanism of the present invention.

According to our experiment, it was confirmed that the recording information and reproduced information coincided with each other with good reproducibility and even if the scanning for recording and reproduction was repetitively effected, the probe 11 could be made to approach the surface of the recording medium without destroying the recording medium. Also, it was confirmed that when the scanning for superposing a pulse voltage having a crest value 3 V on a bias voltage was effected at a point of time whereat the probe 11 approached an area on the recording medium on which recording was effected, the recorded information was erased from the read-out signal reproduced.

In the above-described embodiment, the constructions and amounts of movement of the fine movement section 12 and coarse movement section 13 are not restricted to what have been aforedescribed. For example, even if a DC servo-motor, an inch worm or the like is used, application is readily possible and similar utilization can be made.

Also, the second and third embodiments have both been described with respect to cases where the present invention is applied to STM for measuring a tunnel current as physical information and an information processing apparatus, but the present invention can likewise be applied to a measuring apparatus or the like for observing the force between atoms, capacity, magnetic flux, magnetic force, etc.

As described above, the probe moving apparatus according to any of the second and third embodiments enables the probe to approach the sample without colliding with the latter and therefore, can use the probe while keeping the shape of the tip end thereof sharp and thus, observation higher in spatial resolving power becomes possible. Also, interchange of the probe becomes unnecessary because the probe is not damaged, and this leads to the simplification and compactness of the system in STM or an information recording apparatus.

What is claimed is:

1. An apparatus for moving a probe relative to a predetermined object to cause a physical phenomenon to occur between said probe and said object, and to cause said probe to approach said object, said apparatus comprising:

a first actuator for coarsely moving at least one of said probe and said object relative to the other in a predetermined direction to bring said probe and said object close to each other;

a second actuator for vibrating at least one of said probe and said object to displace one relative to the other in a direction parallel to a surface of said object;

a detection section for detecting a physical phenomenon occurring between said probe and said object and for producing a detection output; and a control section for controlling said second actuator to vibrate at least one of said probe and said object relative to the other in the direction parallel to the surface of said object, and for controlling said first actuator to control the approach of said probe relative to said object on the basis of the detection output by said detection section during the vibrating by said second actuator.

2. An apparatus according to claim 1, wherein said second actuator is capable of finely moving at least one of said probe and said object relative to the other to bring said probe and said object close to each other, and said control section further controls said second actuator to drive said second actuator to bring said probe and said object close to each other.

3. An apparatus according to claim 2, wherein said control section terminates the driving for the approach of said probe to said object by said first actuator when said detection section detects an occurrence of said physical phenomenon.

4. An apparatus according to claim 2, wherein said control section controls said second actuator to repeat a first operation for bringing said probe and said object close to each other by a first predetermined amount, to perform a second operation for spacing said probe and said object apart from each other by a second predetermined amount, and a third operation for bringing said probe and said object close to each other by a third predetermined amount, less than the first predetermined amount, until said detection section detects said physical phenomenon.

5. An apparatus according to claim 4, wherein said control section immediately stops the driving of said second actuator and terminates the driving for the approach of said probe to said object by said first actuator when said detection section detects the occurrence of said physical phenomenon during the first operation.

6. An apparatus according to claim 1, wherein said detection section detects, as the physical phenomenon, a tunnel current flowing between said probe and said object.

7. An apparatus for effecting at least one of information detection from a predetermined object and information input to said predetermined object, said apparatus comprising:
a probe for detecting at least one of the information detection from said object and the information input to said object;
a first actuator for coarsely moving at least one of said probe and said object relative to the other in a predetermined direction to bring said probe and said object close to each other;
a second actuator for vibrating at least one of said probe and said object relative to the other in a direction parallel to a surface of said object;
a detection section for detecting a physical phenomenon occurring between said probe and said object and for producing a detection output; and
a control section for controlling said second actuator to vibrate at least one of said probe and said object relative to the other in the direction parallel to the surface of said object, and for controlling said first actuator to control the approach of said probe relative to said object, on the basis of the detection output by said detection section during the vibrating by said second actuator.

8. An apparatus according to claim 7, wherein said second actuator is capable of finely moving at least one of said probe and said object relative to the other to bring said probe and said object close to each other, and said control section further controls said second actuator to bring said probe and said object close to each other.

9. An apparatus according to claim 7, wherein said object comprises a recording medium and said probe effects at least one of recording of information on and reproducing of information from said recording medium.

10. A method of moving a probe relative to a predetermined object to cause a physical phenomenon to occur between said probe and said object, and to cause said probe to approach said object, said method comprising the steps of:
finely vibrating at least one of said probe and said object relative to the other in a direction parallel to a surface of said object;
detecting a physical phenomenon occurring between said probe and said object and producing a detection output;
coarsely moving, in an approach, at least one of said probe and said object relative to the other to bring said probe and said object close to each other; and
controlling the moving for the approach of said probe relative to said object in said approach moving step on the basis of the detection output produced in said detecting step during the vibrating in said vibrating step.

11. An apparatus for moving a probe relative to a predetermined object to cause a physical phenomenon to occur between said probe and said object, and to cause said probe to approach said object, said apparatus comprising:
a first actuator for coarsely moving at least one of said probe and said object relative to the other in a predetermined direction to bring said probe and said object close to each other;
a second actuator for vibrating at least one of said probe and said object relative to the other in a direction in which said probe and said object are brought close to each other;
a detection section for detecting a physical phenomenon occurring between said probe and said object and for producing a detection output; and
a control section for controlling said second actuator to repeat a first operation for bringing said probe and said object close to each other by a first predetermined amount, to perform a second operation for spacing said probe and said object apart from each other by a second predetermined amount, and a third operation for bringing said probe and said object close to each other by a third predetermined amount, less than the first predetermined amount, until said detection section detects the physical phenomenon, wherein the second and third operations are performed at the same time.

12. An apparatus for effecting at least one of detection of information from a predetermined object and input of information to the predetermined object, said apparatus comprising:
a probe for effecting at least one of detection of the information from the object and input of the information to the object;
an actuator for relatively moving said probe and the object to bring said probe and the object close to each other while relatively vibrating said probe and the object in a direction parallel to a surface of the object;
a detection section for detecting a physical phenomenon occurring between said probe and the object and for producing a detection result; and a control section for controlling said actuator to stop bringing said probe and the object close to each other, on the basis of the detection result of said detection section.

13. A method of effecting at least one of detection of information from a predetermined object and input of information to the predetermined object, by using a probe, said method comprising:

relatively vibrating the probe and the object in a direction parallel to a surface of the object;

detecting a physical phenomenon occurring between the probe and the object and producing a detection result;

relatively moving the probe and the object to bring the probe and the object close to each other; and controlling the relative movement in said moving, on the basis of the detection result in said detecting step, during relative vibration of the probe and the object in said vibrating step.

* * * * *

UNITED STATES PATENT AND TRADEMARK OFFICE
CERTIFICATE OF CORRECTION

PATENT NO. : 5,414,690
DATED : May 9, 1995
INVENTOR(S) : Shun-ichi SHIDO et al.

It is certified that error appears in the above-indentified patent and that said Letters Patent is hereby corrected as shown below:

ON THE COVER PAGE:

UNDER "OTHER PUBLICATIONS":

Following "Stupian, et al." (second occurrence) "2987." should read --2897.--.

COLUMN 5:

Line 65, "1.0 $\mu$m," should read --0.1 $\mu$m,--.

COLUMN 6:

Line 15, "1.0 $\mu$m," should read --0.1 $\mu$m,--.

Signed and Sealed this

Twenty-fifth Day of July, 1995

BRUCE LEHMAN

*Attest:*

*Attesting Officer*     *Commissioner of Patents and Trademarks*